United States Patent
Liem

(10) Patent No.: US 7,424,216 B2
(45) Date of Patent: Sep. 9, 2008

(54) CAMERA FLASH DIFFUSER FOR MACRO PHOTOGRAPHY

(76) Inventor: Ronnie K. Liem, 12905 NE. 25th Pl., Bellevue, WA (US) 98005

( * ) Notice: Subject to any disclaimer, the term of this patent is extended or adjusted under 35 U.S.C. 154(b) by 100 days.

(21) Appl. No.: 11/368,313

(22) Filed: Mar. 3, 2006

(65) Prior Publication Data

US 2006/0245750 A1      Nov. 2, 2006

Related U.S. Application Data

(60) Provisional application No. 60/658,829, filed on Mar. 3, 2005.

(51) Int. Cl.
*G03B 15/02* (2006.01)
*G03B 15/03* (2006.01)
*G03B 15/06* (2006.01)
*G02B 6/10* (2006.01)

(52) U.S. Cl. .................. 396/155; 396/198; 396/199; 396/200; 362/7; 362/16; 385/146; 348/345

(58) Field of Classification Search .................. 396/16, 396/155, 198, 199, 267; 362/3, 7, 16; 385/146, 385/147; 348/345
See application file for complete search history.

(56) References Cited

U.S. PATENT DOCUMENTS 7,127,163 B2 * 10/2006 Lee et al. ..................... 396/198
2005/0068454 A1 * 3/2005 Afsenius ..................... 348/345

* cited by examiner

*Primary Examiner*—Melissa Jan Koval
(74) *Attorney, Agent, or Firm*—Seed IP Law Group PLLC

(57) ABSTRACT

A light diffuser for a camera used in macro photography, the diffuser formed from a prism having a body that includes an opening to accommodate the camera lens such that the body is positioned adjacent the camera flash unit for receiving and redirecting light throughout the body to exit a front face thereof around the lens and illuminate the subject in a desirable manner. Ideally the body is a unitary transparent material having facets formed thereon to provide internal reflection. One or more filter elements aid in conditioning the light processed in the diffuser body, such as diffusing, adding color to, and focusing the light.

19 Claims, 8 Drawing Sheets

CAMERA FLASH DIFFUSER FOR MACRO PHOTOGRAPHY

BACKGROUND OF THE INVENTION

1. Field of the Invention

A device for distributing and redirecting light in association with photographic devices and, more particularly, to a diffuser having a prism for directing light onto a subject, particularly for use in macro photography.

2. Description of the Related Art

Macro photography commonly refers to close-up photography. Photographing subjects in close proximity requires positioning of the camera lens near the subject. However, in order to obtain the necessary magnification, the lens must be as far away from the film plane as possible. Methods of doing this generally include the use of extension tubes, bellows, close-up filters, and macro lenses, typically having the shape of a cylinder referred to as a barrel. A lens is mounted on one end of the barrel and focusing requires a simple twist of the lens barrel to move the lens element away from the film plane. Generally, macro photography presents challenges for lighting the subject.

FIG. 1 illustrates a typical flash camera 10 having a camera body 12 to which is attached a lens 14. The lens 14 is generally cylindrically shaped having a first end 16 attached to the body 12 and a second free end 18 projecting out from the camera 12, usually at a 90° angle to which is attached a lens element 15. The lens 14 may be removably attached or integrally formed with the camera body 12.

A flash unit 20 is associated with the camera 10 to provide additional illumination in low light or dark conditions. Many cameras have built-in flash units on the front 22 of the camera 12, while other cameras have the flash unit 20 removably mounted on the camera body 12. The construction and operation of these flash units 20 will not be described in detail herein because the same are readily commercially available.

Briefly, the flash unit 20 is physically and electrically coupled to the camera shutter actuator mechanism 24 to provide a timed flash of light towards the subject of the photograph so that desired illumination is present at the time the shutter opens and until the shutter closes. Most camera models provide little to no control over the direction, duration, and timing of the flash. As such, these general purpose cameras and flash units are designed for illumination of subjects that are more than twelve inches away from the end 18 of the camera lens element 15.

Attempts to use conventional camera flash units for macro photography result in inadequate lighting of the subject. FIG. 2 illustrates the effect of inadequate lighting conditions. In FIG. 2, the center 26 of the subject 28 is dark because the lens 14 protrudes into the field of illumination from the flash unit 20, casting a shadow on the subject 28 and creating the dark spot on the final image. In other cameras, the flash is concentrated in the area directly in front of the lens 14, causing over-lighting conditions and washing out of the final image. Attempts to overcome these disadvantages include the development of ring flashes for close-up photographic work. FIG. 3 illustrates a commercially-available ring flash 40 utilizing eight small built-in LED's 42 spaced equidistantly around an opening 44 that is placed over the lens 46 of the camera 48, as shown in FIG. 4. While the object of this device is to provide more even illumination on a subject, there are several disadvantages to the use of this device. First, the ring flash may block a flash sensor in the camera. Second, this device does not provide adequate illumination to the subject due to the limited power output of the light source. Third, the light amplitude is constant and cannot be modulated to provide the necessary illumination for the photograph. Conventional ring flashes that have the ability to modulate the light intensity are limited to a small number of high-end camera models and are expensive. In general, they employ complex circuitry for determining light output for proper exposure of the photograph and for interfacing with the camera. Such complex circuitry are bulky and require an independent power source.

Hence, there is a need for a method and device that distributes the light from a conventional flash unit on to a subject in a manner that enables flash macro photography without having to replace or tamper with the existing flash unit.

BRIEF SUMMARY OF THE INVENTION

A camera flash diffuser is provided for use with existing cameras and flash units in macro photography situations. In accordance with one embodiment of the invention, a device for distributing light is provided. The device includes a body having a central opening formed therein, means for receiving light from a first side of the body, and means for redirecting light around the central opening to exit a second side of the body.

In accordance with another embodiment of the invention, a device for distributing light in conjunction with a camera having a lens and a flash unit is provided. The device includes a body having a central opening sized and shaped to be received over the lens of the camera, the body having a first side configured to receive light from the flash, means for redirecting the light from the first side of the body to exit a second side of the body around the central opening.

In accordance with yet another embodiment of the invention, a camera flash diffuser is provided that includes a body having a central aperture sized and shaped to be received over a lens associated with the camera, the body including a first side for receiving light from the camera flash, means for redirecting light within the body, and a second side through which the light exits.

In accordance with yet a further embodiment of the invention, a camera is provided, preferably a photographic camera for creating photographs, including still photographs, moving photographs, digital photographs, television images, and the like that includes a camera body having a lens and a flash unit associated therewith; a diffuser body for distributing light from the flash in an even manner around the lens, the body including an opening sized and shaped to receive the lens; means for receiving light from a first side of the body; and means for redirecting light around the aperture to exit a second side of the body.

BRIEF DESCRIPTION OF THE SEVERAL VIEWS OF THE DRAWINGS

The foregoing features and advantages of the present invention will be more readily appreciated as the same become better understood from the following detailed description when taken in conjunction with the accompanying drawings, wherein.

DETAILED DESCRIPTION OF THE INVENTION

Figure 5:
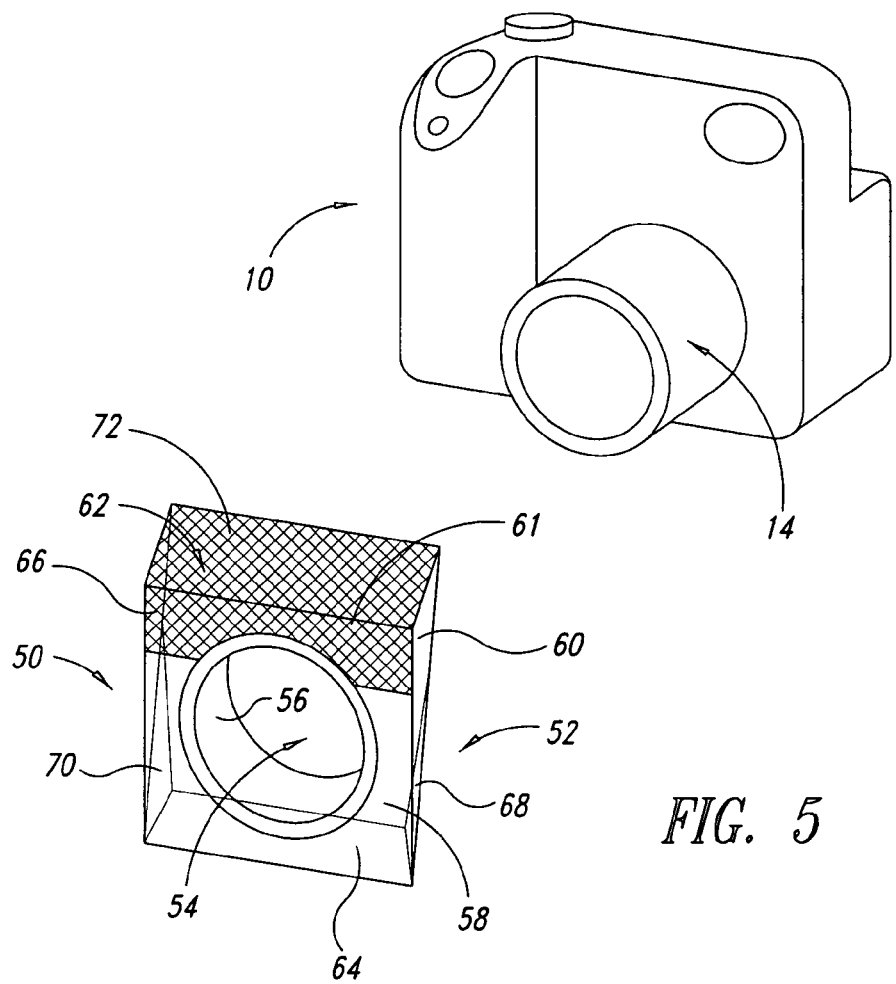
FIG. 5 is an exploded isometric view of a known camera in association with a camera flash diffuser of the present invention.
Figure 6:
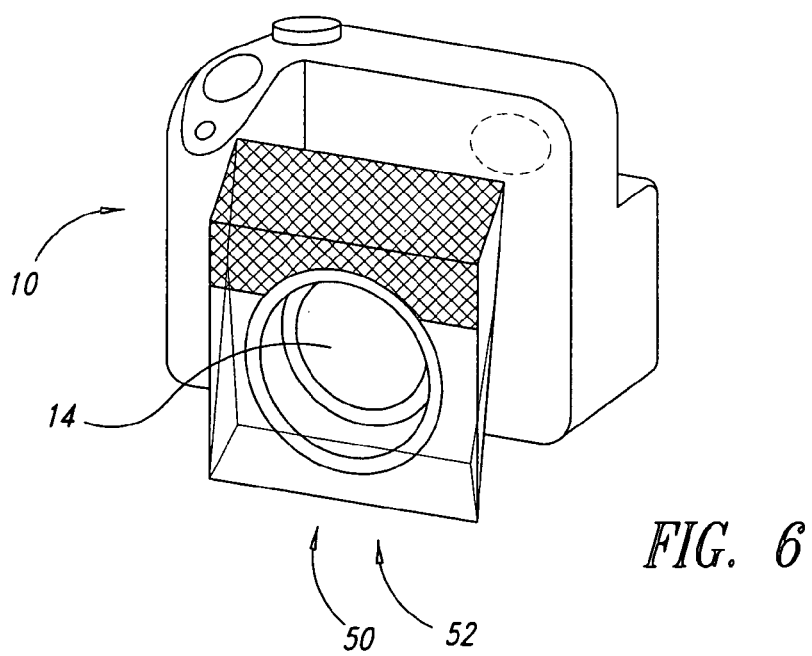
FIG. 6 is an assembled isometric view of the known camera and the camera flash diffuser of FIG. 5.
Figure 7:
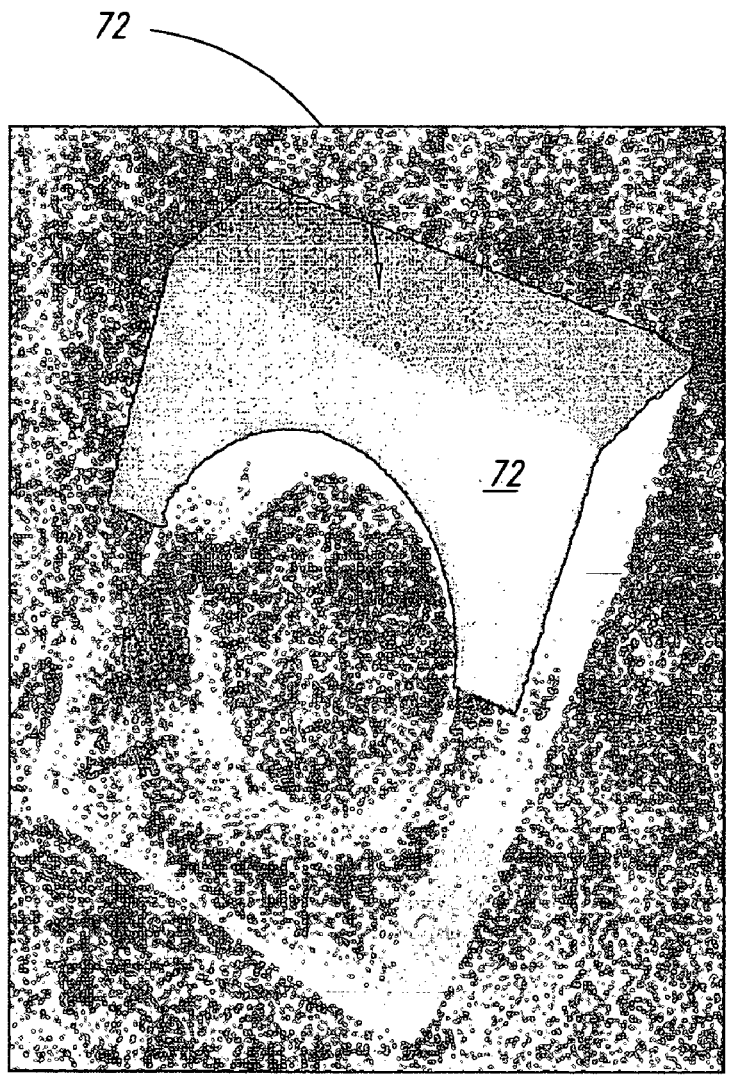
FIG. 7 is an isometric view of the diffuser of the present invention.
Figure 8:
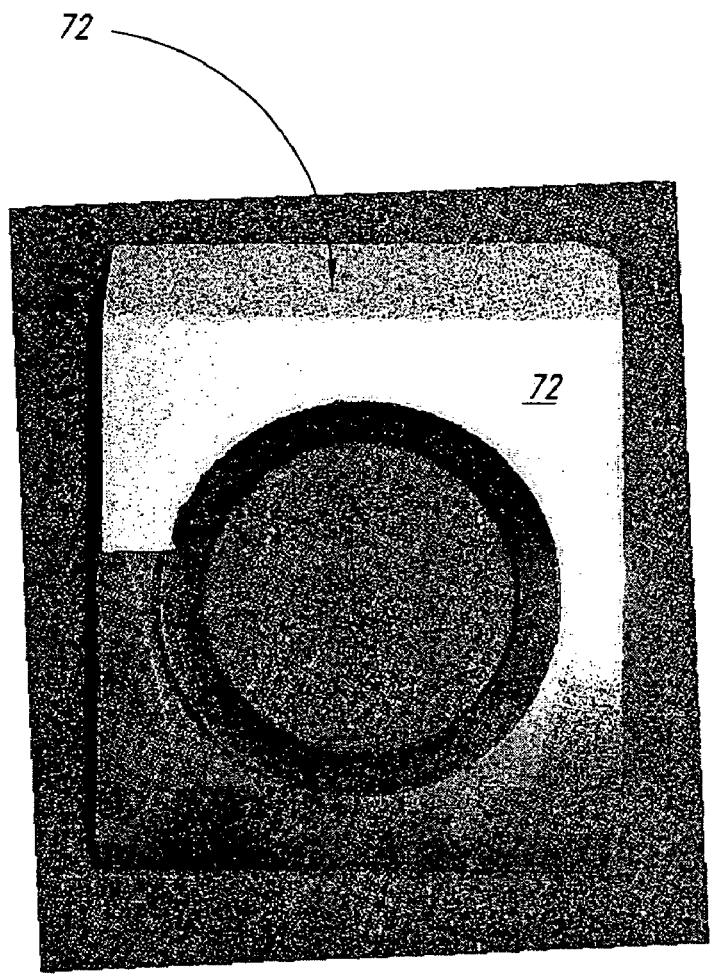
FIG. 8 is a front plan view of the diffuser of FIG. 7.

Referring initially to FIG. 5, shown therein is the conventional camera 10 described above in conjunction with FIG. 1 along with a diffuser 50 formed in accordance with one embodiment of the present invention. The diffuser 50 as shown has a unitary body 52 formed preferably from a single piece of material having an opening 54 formed therethrough. Ideally the opening 54 has a size and shape that allows it to be slidably received over the lens 14 of the camera 10, as shown in FIG. 6. A grommet or rubber boot may be attached around the periphery 56 of the opening 54 to prevent damage to the diffuser 50 and to the lens 14 and to provide a means of retaining the body 52 on the lens 14.

In the depicted embodiment, the diffuser 50 is preferably constructed from a single piece of Lucite material in the form of a prism having a front face 58, a rear face 60, a top face 62, a bottom face 64, and first and second side faces 66, 68. When used with the camera 10, the front face 58 faces toward the subject, and the rear face 60 faces towards the camera body 12 to receive light from the flash unit 20.

In order to distribute light from the flash unit 20 throughout the diffuser body 52 and to direct the light towards the subject beyond the lens 14, at least one angled face is preferably formed in the diffuser body 52. As shown in FIG. 5 and more clearly in FIG. 9, one angled face 70 is formed at the intersection of the rear face 60 and, in this case, the first side face 66. Ideally this angled face 70 is formed at a 45° angle with respect to the rear face 60 and the first side face 66. It is to be understood that other angles may be used, as desired, in order to obtain different diffusion patterns. In addition, other angled faces may be formed at other intersections or other locations on the body 52, such as intersections of the front face 58 and the top face 62, the front face 58 and the bottom face 64, the rear face 60 and the first or second side faces 66, 68, or combinations thereof, such as the front, bottom, and second side faces 58, 64, and 68.

While the angled faces are one means for redirecting light within the diffuser body 52, other means may be used. For example, as shown in FIGS. 5-9, a diffusing element 72 is placed across the top half of the front face 58 of the diffuser body 52 and over the top face 62. The diffusing element 72 allows a portion of light from the flash unit 20 to pass therethrough while the remaining light is reflected into the diffuser body 52 for distribution around the central opening 54 and out the front face 58.

While the diffuser body 52 is generally symmetrical with respect to the opening 54, it can be seen that the top face 62 angles downward towards the front face 58 from the rear face 60, terminating at an intersection 61 above the opening 54, while the bottom face 64 angles downward from the rear face 60 to the front face 58. This is more clearly shown in FIG. 9.

Figure 9:
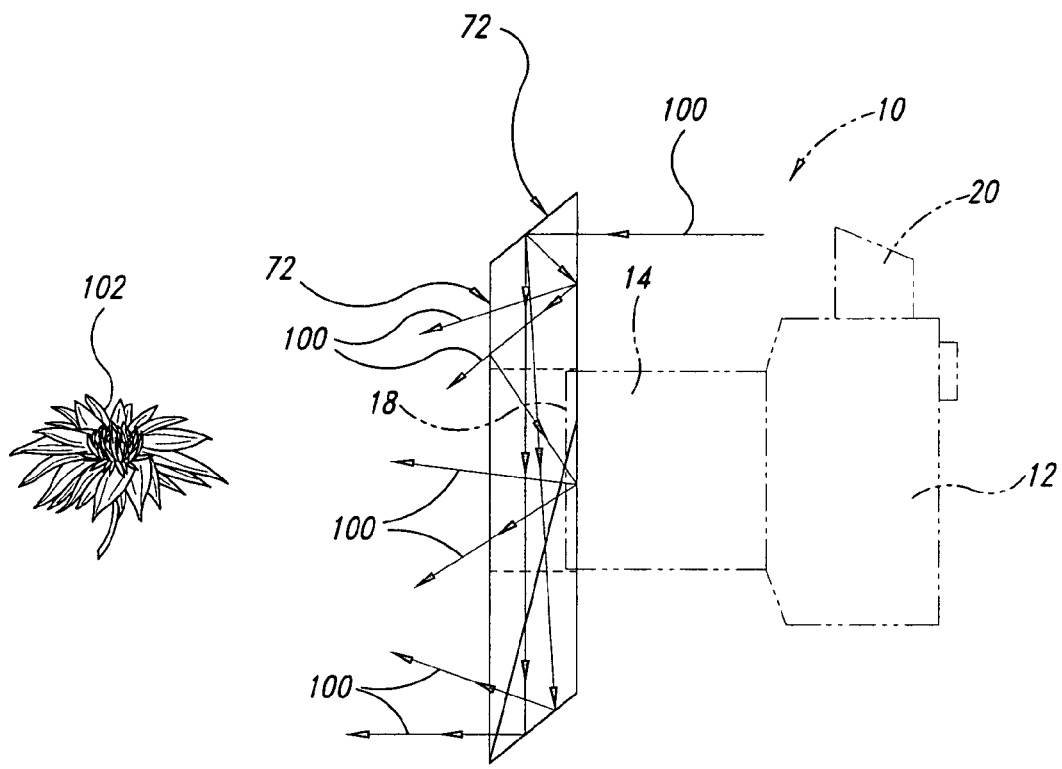
FIG. 9 is a side view of the diffuser of FIG. 7.

The diffusing element 72 also extends a portion of the way down the front face 58 of the diffuser body 52, as shown in FIG. 9. In one embodiment, the diffusing element 72 is constructed of paper, ideally white paper, although other materials that are readily commercially available may be used for providing a similar effect.

As shown in FIG. 9, light emanating from the flash unit 20 associated with the camera 10 (shown in phantom) enters the diffuser body 52 through the rear surface 60. A portion of the light 100 passes through the filter element 72 and the diffuser body 52 to exit the front face 58. Another portion of the light 100 is reflected off the top face 62 throughout the diffuser body 52, some of which reflects off the rear face 60 and the first and second side faces 66, 68 to exit through the front face 58 around the opening 54. More of the light 100 continues through the diffuser body 52 to reflect off the bottom face 64 and out through the front face 58 below the opening 54 and the camera lens 14. Thus, the bright flash of light 100 is redirected and distributed throughout the diffuser body 52 to exit around the opening 54 and the camera lens 14 to illuminate a subject 102.

Figure 1:
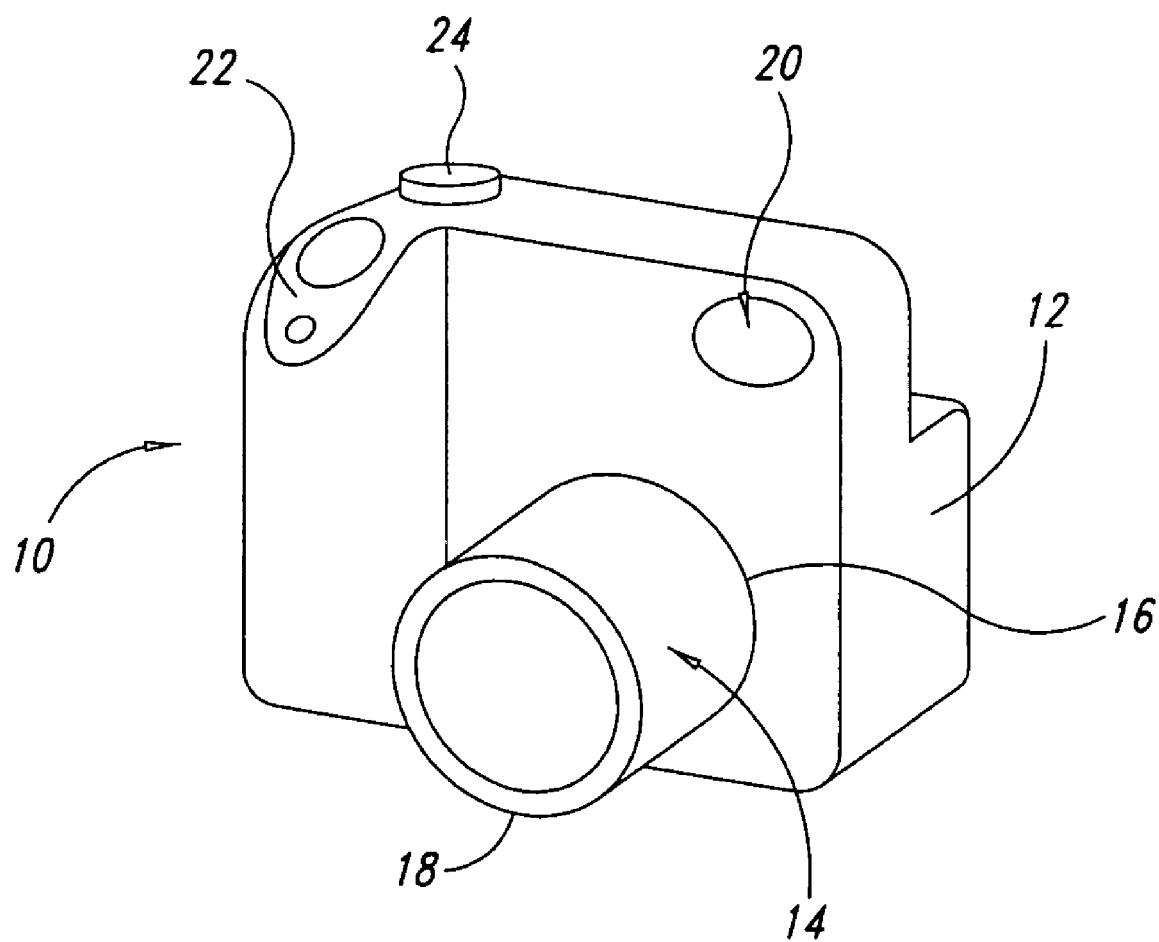
FIG. 1 illustrates a known camera.
Figure 2:
FIG. 2 illustrates a macro photograph taken with existing flash units.
Figure 3:
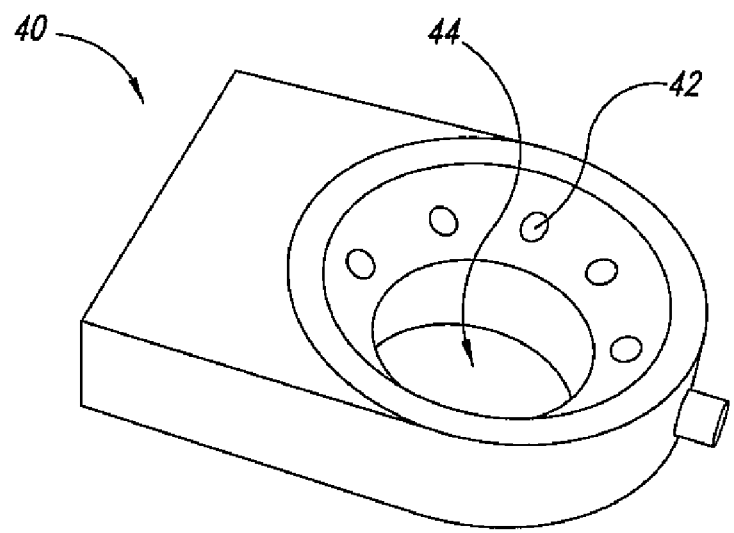
FIG. 3 illustrates a conventional ring flash device.
Figure 4:
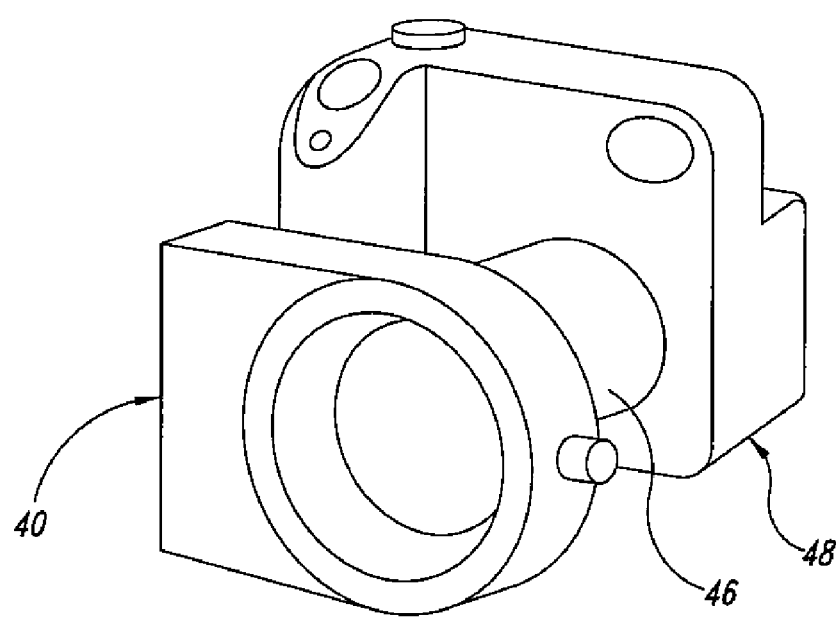
FIG. 4 illustrates an existing camera having the ring flash unit mounted on the lens thereof.
Figure 10:
FIG. 10 is a photograph of the subject of FIG. 2 with correct lighting provided by the present invention.

FIG. 10 illustrates the subject of FIG. 1 photographed using the diffuser 50 of the present invention wherein the light is now evenly directed on to the subject.

In order to retain the diffuser 50 on the lens 14, various means may be used, including an elastomeric or flexible grommet or lining around the opening 54, mechanical means, such as set screws and the like, or a tongue and groove arrangement where the diffuser body 52 matches external configurations on the lens 14 to prevent rotation of the diffuser body 52 with respect to the lens 14. In other embodiments, however, it may be desirable to allow the prism body 52 to rotate relative to the lens to provide or enable adjustment in the direction of light exiting from the diffuser 50.

Attachments can also be used in conjunction with the diffuser 50, such as a magnifier to be placed in front of the lens 14. The magnifier can be attached to the diffuser 50 and configured to be lowered over the lens 14 or raised away from the lens 14 and the front face 58 of the diffuser 50. The magnifier can be clipped on or permanently mounted to the diffuser or, less preferably, to the camera. Color filters and other accessories may also be used in this manner.

The diffuser 50 can also be implemented for use with an active flash that is either slaved to the camera flash or triggered by the camera. The diffuser could also be implemented with a modular light source as an aid in focusing of the camera or as main illumination for the photograph.

While a preferred embodiment of the invention has been illustrated and described, it is to be understood that various changes may be made therein without departing from the spirit and scope of the invention. For example, the diffuser body 52 may be configured to redirect light by any method, including reflection, refraction, scattering, selective attenuation or concentration of the incoming light. Various configurations in the shape of the diffuser 52 may be used, including round, or round with enlarged sides, or various geometric shapes including square, rectangular, pentagonal, hexagonal, octagonal, or a combination of rounded and straight sides. In addition, the diffuser 50 can be hollow with internally-mounted or formed reflectors. Also, light pipes or other light conductors may be used for redirecting and redistributing the light.

Hence, the present invention is not to be limited except by the accompanying claims and the equivalence thereof.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for distributing light from a light source, comprising:
a body formed from a single piece of material having an interior and an opening formed in a first wall and a second wall to extend through the body, the first wall adapted to receive light from the light source into the interior of the body and the second wall adapted to allow light to exit the interior of the body, and at least one reflector formed from the single piece of material for redirecting and distributing light around the opening to exit out of the body through the second wall.

2. The device of claim 1 wherein the body comprises a prism and the at least one reflector is at least one angled face formed on the body.

3. The device of claim 2 wherein the at least one reflector comprises a plurality of faces formed on the body for redirecting light within the interior of the prism and evenly around the opening, and the device further comprising a diffuser element to diffuse at least a portion of the light exiting the prism.

4. A device for distributing light to be used in conjunction with a camera having a lens and a flash, the device comprising:
a body having an interior and a central opening formed through the body and sized and shaped to be received over the lens of the camera and positioned adjacent the camera and the flash, the body having a first side configured to receive light from the flash, and the body having at least one face formed thereon for redirecting the light from the first side of the body to exit a second side of the body and redistributing the light in the interior of the body around the central opening to exit from the second side of the body and around the lens of the camera.

5. The device of claim 4 wherein the body comprises a single piece of prism material and the at least one face comprises a plurality of faces formed on the prism material.

6. The device of claim 5, further comprising a diffuser element to diffuse at least a portion of the light exiting the prism.

7. A camera flash diffuser for use with a lens and flash of the camera, comprising:
a body of refractive material having at least a first face and an opposing second face formed in an annular configuration to define a central aperture that extends completely through the body and that is sized and shaped to be slidably received completely over the lens associated with the camera and positioned adjacent the camera and the flash, the first face of the body adapted to receive light from the camera flash, the body farther comprising at least one reflective face for redirecting light within an interior of the body and to direct the light to exit the body through the second face around the central aperture and around the lens.

8. The device of claim 7 wherein the body comprises a prism formed from a unitary piece of material and the at least one reflective face comprises a plurality of reflective faces formed on the prism.

9. The device of claim 8, further comprising a diffuser element to diffuse at least a portion of the light exiting the prism.

10. The diffuser of claim 7 wherein the body comprises a unitary piece of Lucite material.

11. The diffuser of claim 7, further comprising means for securing the body to the camera.

12. The diffuser of claim 7 wherein the body comprises at least one bottom face, at least one top face, and at least two side faces communicating with the first, second, top, and bottom faces to redirect the light in the interior of the body and redirect light evenly around the central aperture.

13. The diffuser of claim 7, further comprising at least one angled face formed at an intersection of two from among the first face, the second face, the at least one top face, the at least one bottom face, and the at least two side faces of the body.

14. A photographic camera, comprising:
a camera body having a lens and a flash unit associated therewith;
a diffuser body for distributing light from the flash evenly around the lens, the body comprising:
a piece of prism material having an opening formed therethrough that is sized and shaped to be received over the lens and be positioned adjacent the camera body and the flash;
a rear face for receiving light from a first side of the body into an interior of the body and a front face adapted to allow light to exit from the interior of the body; and
a plurality of facets formed on the body for redirecting light in the interior of the body and around the aperture to exit the front face of the body around the lens.

15. The camera of claim 14 wherein the camera comprises one from among a still camera and a video camera.

16. The camera of claim 14 wherein the diffuser body comprises a single unitary piece of refractive material having the front face for receiving light from the flash and the rear face for distributing light around the lens, and at least one angled facet formed at an intersection of two of the plurality of facets thereon for redirecting light throughout the diffuser body.

17. The camera of claim 14 further comprising a magnifier adapted for use with the diffuser body.

18. The camera of claim 17, further comprising a diffuser element on the prism to diffuse at least a portion of the light exiting the prism.

19. The device of claim 1, wherein the at least one reflector is arranged such that light is substantially evenly redirected and distributed around the central opening to exit out of the body through the second wall.

* * * * *